(12) United States Patent
Wu et al.

(10) Patent No.: US 8,404,368 B2
(45) Date of Patent: Mar. 26, 2013

(54) MULTI-LAYER STACK ADJACENT TO GRANULAR LAYER

(75) Inventors: Zhong Wu, Fremont, CA (US); Shanghsien Rou, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 214 days.

(21) Appl. No.: 12/847,768

(22) Filed: Jul. 30, 2010

(65) Prior Publication Data
US 2012/0026627 A1   Feb. 2, 2012

(51) Int. Cl.
G11B 5/66   (2006.01)
G11B 5/667  (2006.01)
G11B 5/673  (2006.01)

(52) U.S. Cl. ............ 428/827; 428/829; 428/830

(58) Field of Classification Search ............. None
See application file for complete search history.

(56) References Cited

U.S. PATENT DOCUMENTS

| | | | |
|---|---|---|---|
| 6,447,936 B1 * | 9/2002 | Futamoto et al. | 428/827 |
| 6,468,670 B1 * | 10/2002 | Ikeda et al. | 428/611 |
| 8,034,470 B2 * | 10/2011 | Oikawa et al. | 428/829 |
| 8,076,013 B2 * | 12/2011 | Sonobe et al. | 428/827 |
| 2006/0147759 A1 * | 7/2006 | Lee et al. | 428/830 |
| 2007/0148499 A1 * | 6/2007 | Sonobe et al. | 428/828 |
| 2008/0131734 A1 * | 6/2008 | Tang et al. | 428/829 |
| 2008/0199735 A1 * | 8/2008 | Berger et al. | 428/828.1 |
| 2009/0011281 A1 * | 1/2009 | Oikawa et al. | 428/812 |
| 2009/0080110 A1 | 3/2009 | Berger et al. | |
| 2009/0109579 A1 | 4/2009 | Takahoshi et al. | |
| 2009/0191331 A1 | 7/2009 | Umezawa et al. | |
| 2010/0110576 A1 * | 5/2010 | Akagi et al. | 360/59 |

OTHER PUBLICATIONS

International Search Report and Written Opinion dated Feb. 23, 2012 from PCT Application No. PCT/US2011/045181, 8 pages.

* cited by examiner

*Primary Examiner* — Kevin Bernatz
(74) *Attorney, Agent, or Firm* — Hollingsworth Davis, LLC

(57) ABSTRACT

In some embodiments, an article comprising a first magnetic recording layer, the first magnetic recording layer including a granular layer having a first magnetic anisotropy and a multi-layer stack adjacent the granular layer, the multi-layer stack comprising one or more substantially magnetic film layers alternating with one or more polarization conductor layers, wherein the multi-layer stack has a second magnetic anisotropy that is greater than the first magnetic anisotropy.

25 Claims, 5 Drawing Sheets

MULTI-LAYER STACK ADJACENT TO GRANULAR LAYER

DETAILED DESCRIPTION

Figure 1:
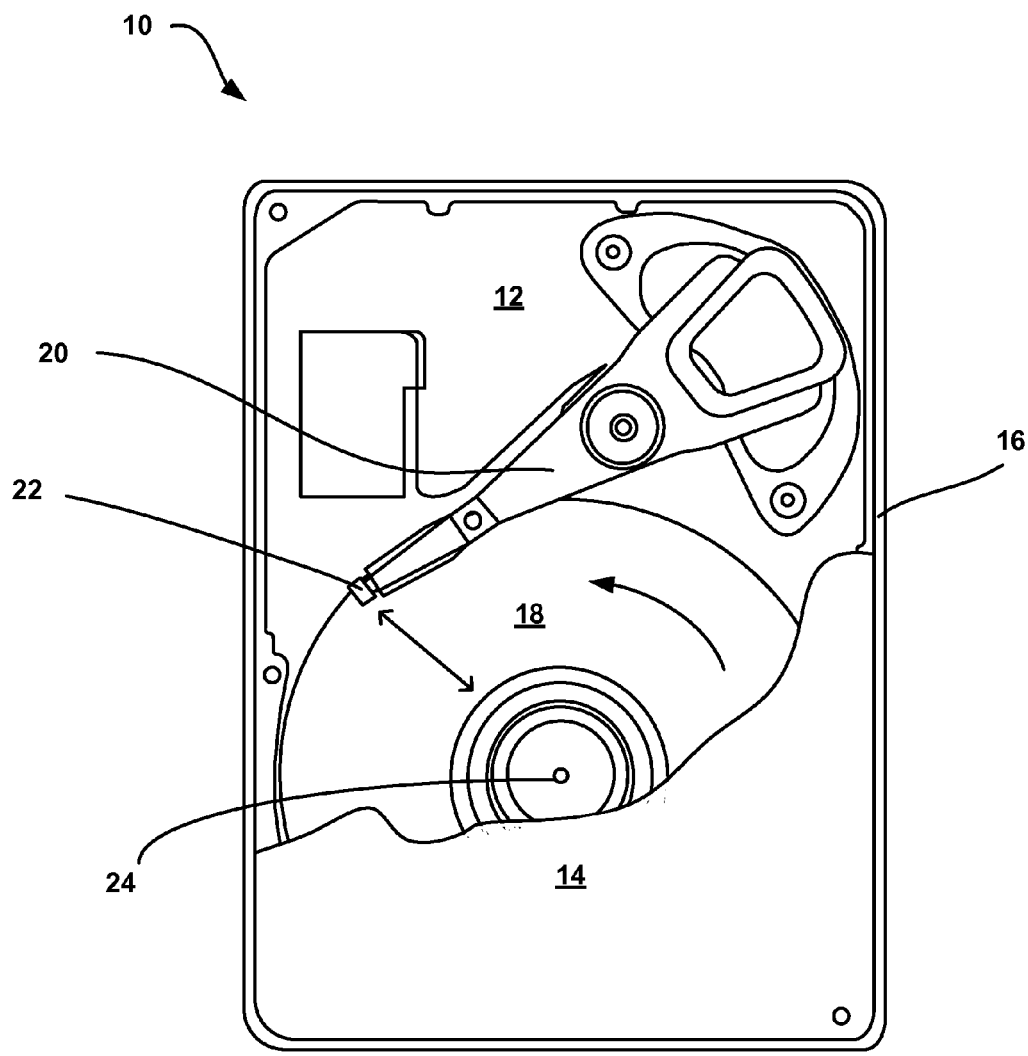
FIG. 1 is a schematic diagram of a hard disc drive including an example perpendicular magnetic data storage medium.

A perpendicular magnetic recording system may include a magnetic read head/write head positioned above one or more rotating magnetic data storage media discs that include a perpendicular magnetic recording layer. The perpendicular magnetic recording layer may include a granular layer having a plurality of grains having a random granular structure. By energizing the recording component of the read/write head, a magnetic field is produced that induces the magnetization of grains to point either up or down, depending on the magnetization direction of the applied field. During the read process, the read/write head senses the magnetic flux generated by the oriented magnetic grains and interprets the magnetic flux as data.

The storage capacity of the storage media may be increased, for example, by increasing the areal density of the magnetic recording layer (commonly expressed as Gigabit per square inch ($Gb/in^2$)). Magnetic data storage media with a smaller average grain diameter may allow for storing the same amount of data in a smaller area. However, magnetic stability of the storage media becomes a greater concern as the storage density increases. The grains maintain their magnetization orientation due to magnetic anisotropy energy of the grains, which is proportional to the grain volume. The anisotropy energy of the grains competes with thermal energy fluctuations, which would orient the magnetization of the grains randomly, such that data storage is hindered. Thermal fluctuation energy depends primarily on temperature. The ratio of magnetic anisotropy energy to thermal fluctuation energy is called the energy barrier, and is a measure of the magnetic stability of the grain magnetization. The energy barrier is proportional to the volume of the grain. Reducing an average grain diameter (and thus volume) increases areal density but reduces magnetic stability.

To mitigate the reduction in magnetic stability of grains, the average magnetic anisotropy energy of the grains can be increased. However, increasing the average magnetic anisotropy energy of the grains also increases a magnetic field used to change the magnetic orientation of the grains during the data recording process.

In some examples, a perpendicular recording medium may include a perpendicular magnetic recording layer that has a single layer or multiple layers grown sequentially on top of one another. In some cases, a granular alloy design may be utilized in which the magnetic recording layer includes one or more thin granular films with CoCrPt, for example, as grain cores surrounded by oxide material at the grain boundaries, such as, e.g., $SiO_2$. The presence of such oxide material at the grain boundaries between CoCrPt grains may suppress the media noise by reducing the exchange coupling between the magnetic grain cores.

The composition of the granular alloys used to form the grain cores may be selected based on intrinsic magnetic properties including magnetization density, $M_s$, and magnetic anisotropy, $H_k$. However, due at least in part to the maximum magnetocrystalline anisotropy limit of CoCrPt alloys and the presence of oxide material in the granular layer, the range of magnetic anisotropy variation and the maximum magnetic anisotropy of such a granular layer, in particular, is relatively limited. To the extent that variation in the magnetic anisotropy may be possible, development and manufacture of such granular recording layers can be time consuming and challenging. The writeability of such media is also a concern as the dimensional reduction of write head transducers is accompanied by a reduction in magnetic write field.

In some aspects, the disclosure generally relates to magnetic data storage media including a perpendicular recording layer. The perpendicular recording layer may include a granular layer as well as a multi-layer stack on the granular layer. The granular layer may include magnetic grains separated by non-magnetic oxide material. The multi-layer stack may include one or more magnetic film layers alternating with one or more polarization conductor film layers, and may have a magnetic anisotropy that is greater than the magnetic anisotropy of the granular layer. For example, the multi-layer stack may include one or more Co films alternating with one or more Pt films or one or more Pd films. Alternatively, the multi-layer stack may include one or more Fe films alternating with one or more Pt films or one or more Pd films. Utilizing a recording layer configuration in which the multi-layer stack has a magnetic anisotropy greater than the granular layer may allow the perpendicular magnetic recording layer to have an effective magnetic anisotropy and/or magnetization density greater than that of the magnetic anisotropy of the granular layer alone.

By forming such an integrated magnetic recording layer, the effective magnetic anisotropy and/or magnetization density of the magnetic recording layer may be tailored or tuned to a value which is different from that of the magnetic anisotropy and magnetization density of the granular layer. For example, the multi-layer stack may be combined with the granular recording layer to form an integrated magnetic recording layer in a manner that allows overall effective magnetic anisotropy and/or magnetization density of the magnetic recording layer to depend on the magnetic anisotropy and magnetization density of both the granular layer and multi-layer stack. In some instances, the multi-layer stack may be rigidly exchanged coupled to the granular layer such that the effective anisotropy of the integrated magnetic recording layer is greater than that of the magnetic anisotropy of the granular layer alone.

In some examples, the magnetic anisotropy and/or magnetization density of the multi-layer stack may be tailored by adjusting one or more properties of the multi-layer stack, such as, e.g., the thickness, composition, and/or number of individual film layers in the multi-layer stack. In this manner, the overall effective magnetization density and magnetic anisotropy of the integrated magnetic layer may be tuned by adjusting such properties of the multi-layer stack. By utilizing such a relationship, the magnetic anisotropy and magnetization density of such an integrated magnetic recording layer is not limited to only that provided by the granular layer alone, but instead may be readily tuned, for example, to a pre-determined magnetic anisotropy and/or magnetization density value different from that of the granular layer alone.

FIG. 1 illustrates an exemplary magnetic disc drive 10 including example rotatable magnetic data storage media 18, each including example perpendicular recording layer. As will be described in greater detail below, perpendicular magnetic data storage media 18 may include an integrated perpendicular magnetic recording layer structure. For example, the magnetic recording layer of perpendicular recording media 18 may include a granular layer and a multi-layer stack including one or more magnetic film layers alternating with one or more polarization conductor layers. The multi-layer stack may have a magnetic anisotropy that is greater than the magnetic anisotropy of the granular layer. In such a configuration, the effective anisotropy of the integrated magnetic recording layer may be greater than that of the magnetic anisotropy of the granular layer.

Disc drive 10 includes base 12 and top cover 14, shown partially cut away. Base 12 combines with top cover 14 to form the housing 16 of disc drive 10. Magnetic data storage media 18 are attached to spindle 24, which operates to rotate media 18 about a central axis. Magnetic read/write head 22 is adjacent to magnetic data storage media 18. Actuator arm 20 carries magnetic read/write head 22 for communication with each of the magnetic data storage media 18.

Magnetic data storage media 18 store information as magnetically oriented bits on a perpendicular magnetic recording layer. Magnetic read/write head 22 includes a recording (write) head that generates a magnetic field sufficient to magnetize discrete domains of the perpendicular magnetic recording layer on magnetic data storage media 18. These discrete domains of the magnetic recording layer each represent a bit of data, with one magnetic orientation representing a "0" and a substantially opposite magnetic orientation representing a "1." Magnetic read/write head 22 also includes a read head that is capable of detecting the magnetic fields of the discrete magnetic domains of the magnetic recording layer.

Figure 2A:
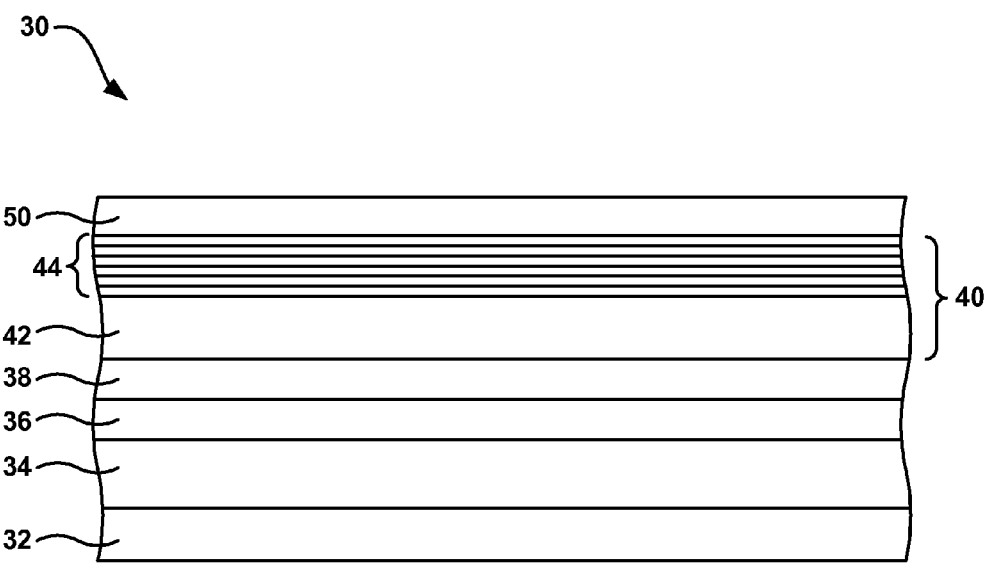
FIGS. 2A and B are schematic block diagrams illustrating an example perpendicular recording medium.

FIG. 2A is a schematic block diagram illustrating an example magnetic data storage medium 30 including perpendicular recording layer 40. Perpendicular recording layer 40 includes granular layer 42 and multi-layer film stack 44. Examples of the disclosure are not limited to the particular configuration of medium 30 shown in FIG. 2. While other example configurations are contemplated, medium 30 is described to illustrate one or more aspects of the present disclosure.

Substrate 32 may include any material that is suitable to be used in magnetic recording medium, including, for example, Al, NiP plated Al, glass, plastic, ceramic glass, or the like. Although not shown in FIG. 2, in some embodiments, an additional underlayer may be present immediately on top of substrate 32. The additional underlayer may be amorphous and provides adhesion to the substrate and low surface roughness.

A soft underlayer (SUL) 34 is formed on substrate 32 (or the additional underlayer, if one is present). SUL 34 may be any soft magnetic material with sufficient saturation magnetization ($B_s$) and low magnetic anisotropy ($H_k$). For example, SUL 34 may be an amorphous soft magnetic material such as: Ni; Co; Fe; an Fe-containing alloy such as NiFe (Permalloy), FeSiAl, or FeSiAlN; a Co-containing allow such as CoZr, CoZrCr, or CoZrNb; or a CoFe-containing alloy such as CoFeZrNb, CoFe, FeCoB, or FeCoC. SUL 34 may provide for a high permeability return path for the field from the poles of magnetic read/write head 22. The thickness of SUL 34 may range from greater than 0 and 1200 angstroms. In some example, the thickness of SUL may be between approximately 10 nanometers to 150 nanometers. In some examples, medium 30 may include multiple SULs.

First interlayer 36 and second interlayer 38 may be used to establish an hcp (hexagonal close packed) crystalline orientation that induces hcp (0002) growth of the magnetic layer 42, with a magnetic easy axis perpendicular to the film plane. In some examples, first and second interlayer may comprise Ru or Ru alloys, such as, e.g., RuCr.

Perpendicular magnetic recording layer 40 may be formed on second interlayer 38, and includes granular layer 42 and multi-layer film stack 44. The magnetic anisotropies of granular layer 42 and multi-layer film stack 44 may each be oriented in a direction substantially perpendicular to the plane of recording layer 40 (e.g., the easy axes of hard granular layer 42 and multi-layer film stack 44 may each be substantially perpendicular to the plane of recording layer 40).

A protective overcoat 50, such as, e.g., diamond like carbon, may be formed over recording layer 40. In other examples, protective overcoat 50 may include, for example, an amorphous carbon layer that further includes hydrogen, nitrogen, hybrid ion-beam deposition, or some mixture thereof.

Figure 2B:
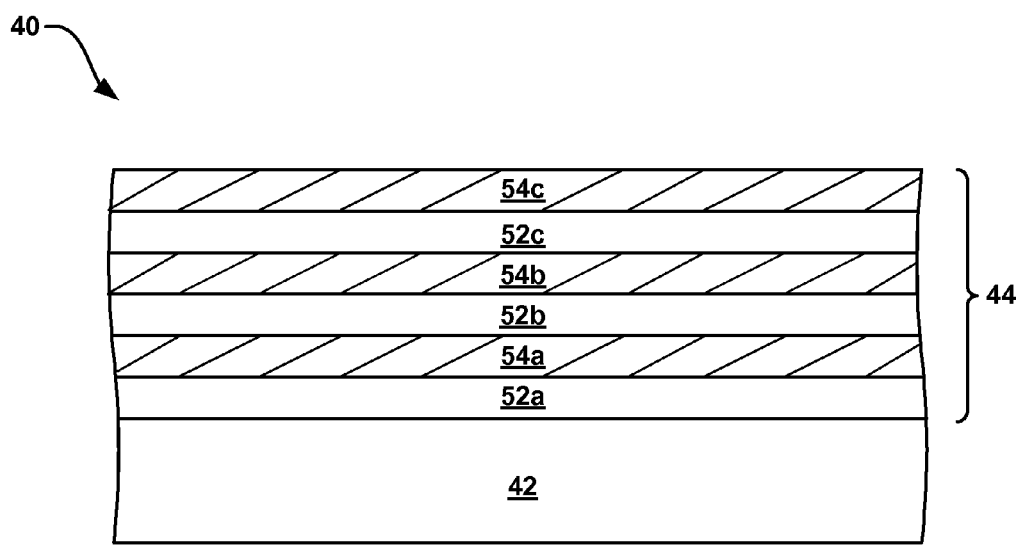

FIG. 2B is a schematic diagram illustrating perpendicular magnetic recording layer 40 of magnetic data storage medium 30 of FIG. 2A. For ease of illustration, magnetic recording layer 40 is shown in FIG. 2B without substrate 32, SUL 34, first and second interlayers 36 and 38, and protective overcoat 50 shown in FIG. 2A.

Perpendicular magnetic recording layer 40 includes multi-layer stack 44 formed on granular layer 42. In some embodiments, granular layer 42 may include Co alloys as grain cores. For example, the Co alloy may include Co in combination with at least one of Cr, Ni, Pt, Ta, B, Nb, O, Ti, Si, Mo, Cu, Ag, Ge, or Fe. Granular layer 42 may also include one or more non-magnetic oxides, such as, e.g., $SiO_2$, $TiO_2$ CoO, $Cr_2O_3$, $Ta_2O_5$, which segregate the magnetic grains within granular layer 40. Granular layer 42 may be formed of a single thin-film layer or multiple adjacent granular film layers. In some embodiments, granular layer 42 may be a laminated structure with a plurality of adjacent magnetic granular film layers separated by one or more thin non-magnetic spacer layers. Example materials for the non-magnetic spacer layers include materials that are substantially non-magnetic, such as, e.g., Cr, Ru, CoCr, Pt, or alloys thereof. In some embodiments, granular layer 42 may have a thickness between approximately 20 Å to approximately 200 Å, such as, e.g., a thickness between approximately 40 Å to approximately 120 Å. Other thicknesses for granular layer 42 are also contemplated.

The magnetic anisotropy and magnetization density of granular layer 42 may depend on a number of factors, including the grain composition and the concentration and type of oxide material present in granular layer 42. For example, as described above, in examples in which granular layer 42 includes a Co-alloy magnetic grains segregated by non-magnetic oxides, the range of magnetic anisotropy of granular layer 42 may be limited to at least some extent by the maximum crystalline magnetic anisotropy of the specific Co-alloy of the grain cores within granular layer and the presence of the oxide material in granular layer 42. In some examples, granular layer 42 may have a magnetic anisotropy that is less than approximately 25 kOe, such as, e.g., less than approximately 20 kOe.

To increase the effective magnetic anisotropy of magnetic recording layer 40 beyond that of the magnetic anisotropy of granular layer 42, which may be bound by one or more factors described herein, magnetic recording layer 40 includes multi-layer stack 44. Multi-layer stack 44 may be formed directly or indirectly (e.g., separated by one or more spacer layers) on granular layer 42. Multi-layer stack 44 may include a plurality of film layers alternating between magnetic and polarization conductor film layers. In the example shown in FIG. 2B, multi-layer stack includes six total film layers alternating between magnetic film layers and polarization conductor layers. In particular, multi-layer 44 includes three magnetic film layers 52a-c (collectively referred to as "magnetic film layers 52") alternating with three polarization conductor layers 54a-c (collectively referred to as "polarization conductor layers 54"). However, the number of layers in multi-layer stack 44 is not limited to six layers as shown in FIGS. 2A and 2B. In some examples, multi-layer stack 44 may include between approximately two and approximately twenty layers (e.g., between approximately 1 and 10 layers for each of magnetic layers 52 and polarization conductor layers 54). Other numbers of layers in multi-layer stack 44 are contemplated.

Magnetic film layers 52 may include one or more suitable magnetic materials, and polarization layers 54 may include one or more suitable materials that are polarization conductors. Polarization conductor layers 54 generally may include a certain metal or other material that conducts polarization, or magnetic interaction, between ferromagnetic materials such as the materials of magnetic film layers 52, e.g., in a manner similar to that of an electric conductor that conducts electricity. In some examples, magnetic layer 52 may include one or more of Co and Fe, and polarization layers 52 may include one or more of Pt and Pd. For example, multi-layer stack 44 may include alternating layers of Co and Pt, Co and Pd, Fe and Pt, and Fe and Pd. The magnetic film layers 52 and polarization conductor layers 54 may be continuous (non-granular) or granular (e.g., with oxides or other suitable materials at the magnetic grain boundaries. In some examples, magnetic film layer 52 and polarization conductor layer 54 are both continuous or both granular layers, while in other examples, magnetic film layers 52 may be continuous and polarization conductor layers 54 may be granular, or vice versa.

In general, the configuration of multi-layer stack 44 may utilize the interface generated magnetic anisotropy between a magnetic material layer and polarization conductor layer. By alternating magnetic layers 52 and polarization conductor layers 54, multi-layer stack 44 may have a magnetic anisotropy value that exceeds that of granular layer 42. In this manner, magnetic recording layer 40 does not have the magnetic anisotropy value provided by that of granular layer 42 alone. Instead, magnetic recording layer 40 may include multi-layer stack 44 in addition to granular layer 42 to increase the effective magnetic anisotropy of magnetic recording layer 40 beyond that of the magnetic anisotropy value of granular layer 42. The effective magnetic anisotropy of perpendicular magnetic recording layer 40 may be between that of the magnetic anisotropy of granular layer 42 and the magnetic anisotropy of multi-layer stack 44. In some examples, the effective magnetic anisotropy of magnetic recording layer 40 is increased from that of the magnetic anisotropy of granular layer 42 using multi-layer stack 44 by first order to volume-averaged value.

The magnetic anisotropy value of multi-layer stack 44 and, thus, the effective magnetic anisotropy of magnetic recording layer 40, may be varied by adjusting one or more properties of multi-layer stack 44. For example, the number of magnetic layers 52a-c and polarization layers 54a-c may influence the magnetic anisotropy of multi-layer stack 44. As multi-layer stack 44 utilizes interface generated magnetic anisotropy, an increase in the number of alternating magnetic layers and polarization conductor layers 54 of multi-layer stack 44 may increase the magnetic anisotropy of multi-layer stack 44 and the effective magnetic anisotropy of magnetic recording layer 40. In some examples, multi-layer stack 44 may include between approximately two to approximately twenty layers alternating between magnetic layers 52 and polarization conductor layers 54, such as, e.g., between approximately four and approximately ten layers.

In some examples, multi-layer stack 44 may include the same number of magnetic layers 52 as polarization conductor layers 54, while in other examples, multi-layer stack 44 may include more magnetic layers 52 than polarization layers 54, or vice versa. For example, if the total number of magnetic and polarization layers in multi-layer stack 44 is an odd number, multi-layer stack may include one more or one less magnetic layer 52 than polarization layer 54. The nearest layer to granular layer 42 may be either a magnetic layer 52 (as shown in FIG. 2B) or a polarization layer 54. Similarly, the top layer of multi-layer stack 44 may be either a magnetic layer 52 or a polarization layer 54 (as shown in FIG. 2B).

As another example, the thickness of individual magnetic layers 52 and polarization conductors 54, in addition to the overall thickness of multi-layer stack 44, may influence the magnetic anisotropy of multi-layer stack 44. In some examples, the individual layers of magnetic layers 52 and polarization layers 54 may have a thickness between approximately 0.5 angstroms and approximately 12 angstroms. The overall thickness of multi-layer stack 44 may be between approximately 1 angstrom and approximately 240 angstroms.

In some examples, the thickness of the individual layers of magnetic layers 52 may be substantially the same as the thickness of the individual layers of polarization layers 54. In other examples, the individual layers of magnetic layers 52 may have a different thickness that that of the individual layers of polarization layers 54. Further, the thickness of each individual magnetic layer (e.g., magnetic layers 52a, 52b, and 52c) may be substantially the same as each other in some examples, while in other examples, the thickness the individual layers of magnetic layers 52 may vary. For example, the thickness of individual layers of magnetic layers 52 may be provided to form a thickness gradient in all or a portion of layer stack 44 (e.g., the thickness of individual layers may decrease from magnetic layer 52a to magnetic layer 52b to magnetic layer 52c). This may also be the case for the individual layers of polarization layers 54. In some examples, the overall thickness of multi-layer stack 44 may be approximately 50 percent from magnetic layers 52 and approximately 50 percent from polarization conductor layers 54.

As another example, the composition of magnetic layers 52a-c and polarization layer 54a-c may also influence the magnetic anisotropy of multi-layer stack 44. As described above, magnetic layers 52 may include one or more suitable magnetic materials, such as, e.g., Co and Fe, and polarization conductor layers 54 may include one or more suitable polarization conductor materials, such as, e.g., Pt and Pd. In some examples, each magnetic layer 52a-c has substantially the same composition as one another, i.e., magnetic layer 52a has substantially the same composition as magnetic layer 52b and magnetic layer 52c. Similarly, in some examples, each polarization layer 54a-c has substantially the same composition as one another. In other examples, the composition of respective layers of magnetic layers 52 and/or polarization layers 54 may vary among each other to provide multi-layer 44 with a predetermined magnetic anisotropy value.

Values for above-described factors (e.g., number of layers and/or layer thickness) may be selected such that multi-layer stack 44 has a magnetic anisotropy greater than that of granular layer 42. In some examples, multi-layer stack 44 may have a magnetic anisotropy greater than zero but less than approximately 40 kOe, such as, e.g., a magnetic anisotropy of between approximately 5 kOe and approximately 40 kOe, between approximately 20 kOe and approximately 40 kOe, or between approximately 25 kOe and approximately 35 kOe. In each case, multi-layer stack 44 may be configured to provide a predetermined effective magnetic anisotropy for magnetic recording layer 40 which is different than that of granular layer 42. By adjusting one or more of the above-described parameters of multi-layer stack 44, the effective magnetic anisotropy of magnetic recording layer 44 may be tuned to a predetermined value despite the magnetic anisotropy limits of granular layer 42. In some examples, by utilizing multi-layer stack 44 in combination with granular layer 42, magnetic recording layer 40 may have an effective magnetic anisotropy between 0 and approximately 40 kOe, such as, e.g., between approximately 20 kOe and approximately 35 kOe. In some examples, the effective anisotropy of magnetic recording layer 44 may be greater than 25 kOe.

Figure 5:
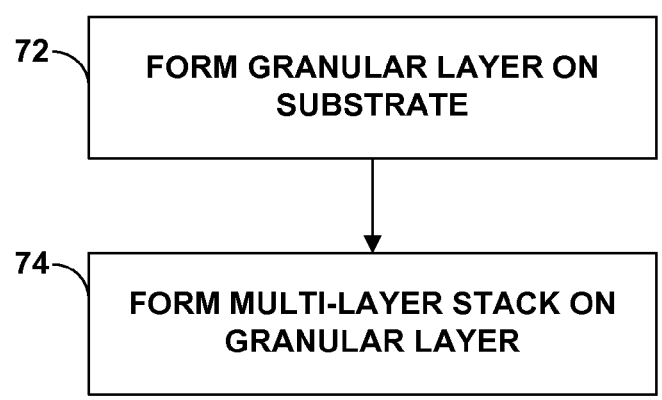
FIG. 5 is a flow diagram illustrating an example process for manufacturing the example magnetic recording layer of the example perpendicular recording medium shown in FIGS. 2A and 2B.

FIG. 5 illustrates an example process for manufacturing magnetic recording layer 40 of storage medium 30. As shown, granular layer 42 may be formed on substrate 30, as well as SUL 34, first interlayer 36, and second interlayer 38 (72). Subsequently, multi-layer stack 44 may be formed on granular layer 42 (74), e.g., by sequentially forming magnetic layers 52a-c and polarization layer 54a-c in the order shown in FIG. 2B. In accordance with the example process of FIG. 5, in some examples, the disclosure relates to a method comprising forming a perpendicular recording layer on a substrate, wherein the perpendicular recording layer comprises a granular layer having a first magnetic anisotropy and a multi-layer stack adjacent the granular layer, the multi-layer stack comprising one or more substantially magnetic film layers alternating with one or more polarization conductor layers, where the multi-layer stack has a second anisotropy that is greater than the first anisotropy.

Any suitable technique may be utilized to form granular layer 42 (72) and the layers of multi-layer stack 44 (74) of magnetic recording layer 40. In some examples, (e.g., industrial applications) a DC magnetron sputter process under vacuum may be used to form granular layers 42 and multi-layer stack 44. Depending on desired layer properties, an individual layer may be formed using a single or multiple deposition steps. For example, to form layer 52a of multi-layer stack 44, multiple sub-layers of magnetic material may be formed by the sequential deposition of magnetic material directly on top of each other. Despite the multiple deposition steps, magnetic layer 52a may be referred to as a single magnetic layer.

Figure 3:
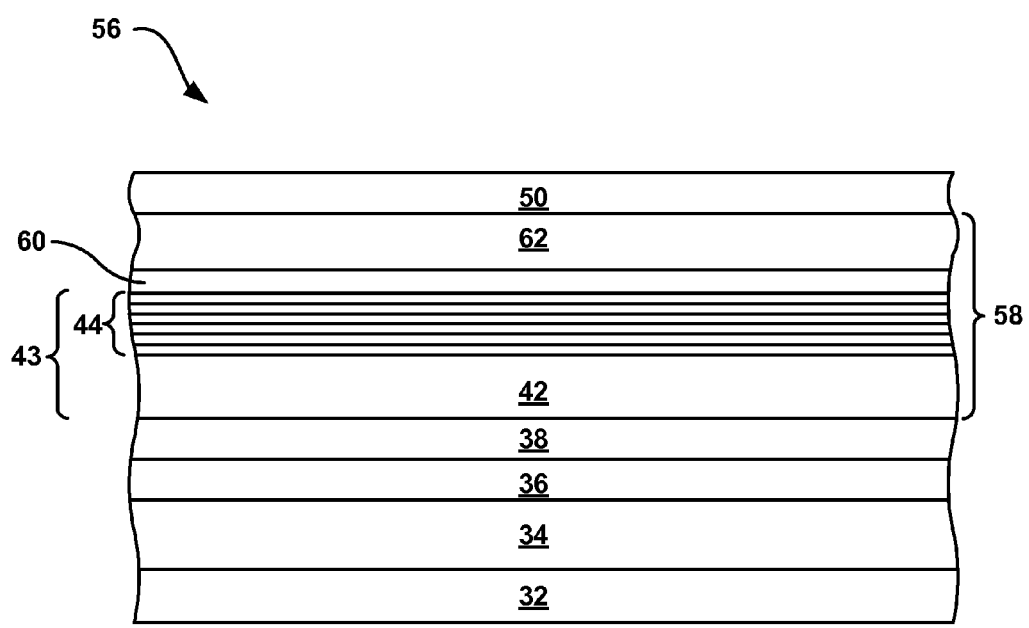
FIG. 3 is a schematic block diagram illustrating another example perpendicular recording medium.

FIG. 3 is a schematic block diagram illustrating an example magnetic data storage medium 56. Magnetic data storage medium 56 includes substrate 32, SUL 34, first interlayer 36, second interlayer 38, perpendicular recording layer 58, and protective layer 50. Substrate 32, SUL 34, first interlayer 36, second interlayer 38, and protective layer 50 may be the same or substantially similar to that of the similarly number features of example magnetic data storage medium 30 shown in FIG. 2A. However, different from that of storage medium 30, perpendicular recording layer 58 of magnetic data storage medium 56 includes exchange break layer 60 and soft magnetic layer 62 in addition to that of granular layer 42 and multi-layer stack 44.

Granular layer 42 and multi-layer stack 44 may be the same or substantially similar to that previously described with regard to magnetic recording layer 40 of medium 30 (FIGS. 2A and 2B). For example, granular layer 42 may have a magnetic anisotropy that is less than the magnetic anisotropy of multi-layer stack 44. In the example of FIG. 3, the combination of granular layer 44 and multi-layer stack form hard magnetic layer 43, where the grains of granular layer 42 may be oriented to store information as described above. The effectively anisotropy of hard magnetic layer 34 may be greater than that of the magnetic anisotropy of granular layer 42 due at least in part to the incorporation of multi-layer stack 44 in hard magnetic layer 43.

In some embodiments, soft magnetic layer 62 may be a granular layer that includes one or more Co alloys. For example, the Co alloy may include Co in combination with at least one of Cr, Ni, Pt, Ta, B, Nb, 0, Ti, Si, Mo, Cu, Ag, Ge, or Fe. In some embodiments, soft magnetic layer 62 may include a non-magnetic oxide, such as $SiO_2$, $TiO_2$ CoO, $Cr_2O_3$, $Ta_2O_5$, or the like, which separates the magnetic grains within the layer. The compositions of granular layer 42 and soft magnetic layer 62 may be the same, or may be different.

The magnetic anisotropies of the granular layer 42, multi-layer stack 44 and soft magnetic layer 62 may each be oriented in a direction substantially perpendicular to the plane of recording layer 58 (e.g., the easy axes of granular layer 42, multi-layer stack 44 may each be substantially perpendicular to the plane of recording layer 58).

The configuration of magnetic storage medium 56 may represent one example in which the combination of multi-layer stack 44 and granular layer 42 is incorporated into what may be referred to as an exchanged coupled composite (ECC) design. In an ECC design, increased ease of recording data to magnetic recording layer 58 may be achieved through the ECC effect, in which the magnetically softer layer(s) (e.g., soft magnetic layer 62) of recording layer 58 begins to switch magnetic orientations before hard layer 43, and particularly granular layer 42, begins to switch magnetic orientations when a recording field is applied. Soft magnetic layer 62 then exercises a magnetic torque on the hard magnetic layer 43, thus reducing the effective coercivity of magnetic recording layer 58. Consistent with an ECC design, hard magnetic layer 43 has an effective anisotropy that is greater than the magnetic anisotropy of soft magnetic layer 62. The ECC design may allow for a switching field (coercivity) for the grains that is smaller than the value expected from the average of the magnetic anisotropies of the hard magnetic layer 43 and the soft magnetic layer 62.

In order to achieve the ECC effect, magnetic orientation switching of soft layer 62 and the hard layer 43 should be non-coherent. For example, when magnetic recording layer 58 exhibits non-coherent magnetic orientation switching, the magnetic orientation of the soft layer 62 begins switching at an applied magnetic field value below an average magnetic anisotropy of magnetic recording layer 58 (i.e., the average magnetic anisotropy of the soft layer 62 and the hard layer 43). In contrast, when switching of magnetic orientation of the layers in a magnetic recording layer is coherent, as for some magnetic media, the magnetic field necessary to switch the magnetic orientation of grains in magnetic recording layer is maximum when the external field is parallel to the easy axis of the grains and minimum when the applied field angle is 45 degrees.

Magnetic recording layer 58 may include exchange break layer 60 between hard magnetic layer 43 and soft magnetic layer 62. Exchange break layer 60 may be used to adjust the vertical exchange coupling between the hard magnetic layer 43 and soft magnetic layer 62. Exchange break layer 60 may include one or more non-magnetic materials such as, e.g., Ru or Ru alloys, such as, e.g., RuCr, RuCo, and the like.

Exchange break layer 60 may affect the vertical exchange coupling between the soft layer 62 and hard layer 43, so that the nucleation field used to nucleate switching in the soft layer is not prohibitively high, but at the same time, the soft layer is able to exercise a magnetic torque on the hard layer. Thus, exchange break layer 60 may reduce the overall coercivity of the magnetic recording layer 58 and facilitate recording of data to magnetic recording layer 58. In some examples, exchange break layer 60 may have a thickness between 0 and approximately 30 angstroms, such as, e.g., between approximately 2 angstroms and approximately 20 angstroms.

In some examples, soft magnetic layer 62 may have a magnetic anisotropy between greater than 0 and approximately 25 kOe, such as, e.g., approximately 2 kOe and approximately 20 kOe. In some examples, the magnetic anisotropy of soft magnetic layer 62 may be greater than the magnetic anisotropy of granular layer 42 but less than the effective anisotropy of hard magnetic layer 43. The magnetic anisotropies of both hard magnetic layer 43 and soft magnetic layer 62 may be selected such that the resulting magnetic recording layer 58 matches the given head field, e.g., is writeable at a magnetic field that magnetic read/write head 22 (FIG. 1) is able to produce.

By utilizing multi-layer stack 44 in addition to granular layer 42 to form hard magnetic layer 43 in the ECC design of medium 56, hard magnetic layer 43 may have an effective magnetic anisotropy value greater than the magnetic anisotropy provided by the composition of granular layer 42. As such, the difference between the anisotropies of hard magnetic layer 43 and soft magnetic layer 62 may be increased without lowering the magnetic anisotropy of soft magnetic layer 62. The greater magnetic anisotropy difference may enhance the ECC effect between soft magnetic layer 62 and hard magnetic layer, or may allow for one or more additional soft magnetic layers to perpendicular recording layer 58 which have magnetic anisotropy value(s) between that of hard magnetic layer 43 and soft magnetic layer 62. Furthermore, the overall magnetic anisotropy of perpendicular recording layer 58 (e.g., the combination of hard magnetic layer 43 and soft magnetic layer 62) may be increased without increasing the magnetic anisotropy of soft magnetic layer 62. Such an increase in overall magnetic anisotropy may increase the magnetic stability of granular layer 42.

Figure 4:
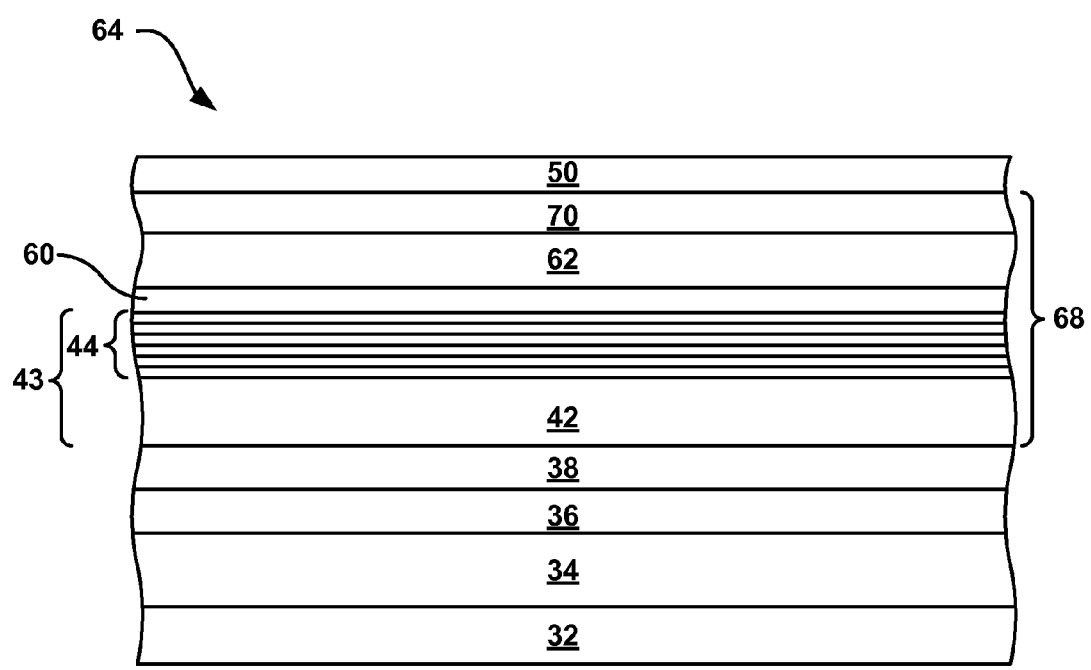
FIG. 4 is a schematic block diagram illustrating another example perpendicular recording medium.

FIG. 4 is a schematic block diagram illustrating an example magnetic data storage medium 64. Magnetic data storage medium 64 includes substrate 32, SUL 34, first interlayer 36, second interlayer 38, perpendicular recording layer 68, and protective layer 50. Magnetic data storage medium 64 may be substantially the same as that as magnetic data storage medium 56 (FIG. 3). However, in addition to soft magnetic layer 62, exchange break layer 60, and hard magnetic layer 43, perpendicular recording layer 68 includes continuous granular coupled (CGC) layer 70 to provide a continuous granular coupled design in addition to an ECC design. CGC layer 70 may provide lateral exchange interaction among the grains of the granular layer 42 of hard magnetic layer 43. The lateral magnetic exchange interaction facilitates alignment of neighboring grains in the same magnetization orientation. Uniformity of lateral magnetic exchange interaction among the grains may enhance recording performance.

In some embodiments, CGC layer 70 may comprise CoCrPtBZ, where Z is a metal or rare earth element dopant, such as Ru, W, and Nb. In some examples, CGC layer 70 may comprise Ta and/or Cu. CGC layer 70 may have a thickness between 0 and approximately 80 angstroms, such as, e.g., between approximately 20 angstroms and approximately 60 angstroms. In some embodiments, CGC layer 68 may include a small amount of an oxide, such as, e.g., $SiO_x$, $TiO_x$, $TaO_x$, $WO_x$, $NbO_x$, $CrO_x$, and $CoO_x$. In other embodiments, CGC layer 70 may not include an oxide. Other layer thicknesses are contemplated and compositions are contemplated.

CGC layer 70 may have a magnetic anisotropy that is less than that of the effective magnetic anisotropy of hard magnetic layer 43. In some embodiments, the magnetic anisotropy values of the three magnetic layers (hard magnetic layer 43, soft magnetic layer 62, and CGC layer 70) may decrease from the hard magnetic layer 43 to CGC layer 70. Thus, hard magnetic layer 43 may have the highest magnetic anisotropy, soft magnetic layer 62 may have an intermediate magnetic anisotropy, and CGC layer 70 may have the lowest magnetic anisotropy. The actual magnetic anisotropy values used in the three layers and the thickness of break layer 60 may be selected such that the resulting magnetic recording layer 40 matches the given head field, e.g., is writeable at a magnetic field that magnetic recording and read head 22 (FIG. 1) is able to produce.

In some embodiments, the effective magnetic anisotropy value of hard magnetic layer 43 may be between approximately 15 kOe and approximately 25 kOe, the magnetic anisotropy value of soft magnetic layer 62 may be between approximately 5 kOe and approximately 20 kOe, and the magnetic anisotropy value of CGC layer 68 may be between approximately 2 kOe and approximately 20 kOe. As described above, the magnetic anisotropy of multi-layer stack 44 may be greater than that of the magnetic anisotropy of granular layer 42 such that the effective magnetic anisotropy of hard magnetic layer 43 may be greater than that of granular layer 42.

In some embodiments, perpendicular recording layer 68 may include a second exchange break layer between soft magnetic layer 62 and CGC layer 70. The second exchange break layer may separate soft magnetic layer 62 and CGC layer 70 so that the low anisotropy of soft magnetic layer 62 is not averaged with the magnetic anisotropy of CGC layer 70, which may be higher than the magnetic anisotropy of soft magnetic layer 62. This may increase the contrast in magnetic anisotropy values between soft magnetic layer 62 and hard magnetic layer 43 compared to a recording layer having a CGC layer 70 immediately adjacent to soft magnetic layer 62. An increased contrast in magnetic anisotropy may enhance the ECC effect.

While CGC layer 70 is shown in combination with an ECC design in FIG. 4, in some embodiments perpendicular recording layer 68 may include CGC layer 70 but not soft magnetic layer 62 and/or exchange break layer 60. For example, perpendicular recording layer 68 may include CGC layer 70 overlying hard magnetic layer 43 without soft magnetic layer 62 or exchange break layer 60. In such a case, CGC layer 68 may still provide lateral exchange interaction among the grains of the granular layer 42 of hard magnetic layer 43.

Various embodiments of the invention have been described. The implementations described above and other implementations are within the scope of the following claims.

The invention claimed is:

1. A medium comprising:
   a substrate; and
   a perpendicular recording layer on the substrate, the perpendicular recording layer including a granular layer having a first magnetic anisotropy and a multi-layer stack adjacent the granular layer, the multi-layer stack comprising one or more substantially magnetic film layers alternating with one or more polarization conductor layers, wherein the multi-layer stack has a second magnetic anisotropy that is greater than the first magnetic anisotropy and wherein at least one of thicknesses of the magnetic film layers form a thickness gradient of the magnetic film layers in all or a portion of the multi-layer stack and thicknesses of the polarization conduction layers form a thickness gradient of the polarization conduction layers in all or a portion of the multi-layer stack.

2. The medium of claim 1, wherein the multi-layer stack is adjacent to the granular layer and the perpendicular recording layer has an effective magnetic anisotropy greater than that of the first magnetic anisotropy.

3. The medium of claim 1, wherein the perpendicular recording layer has an effective anisotropy greater than 25 kOe.

4. The medium of claim 1, wherein the second anisotropy of the multi-layer stack is between approximately 5 kOe and approximately 40 kOe.

5. The medium of claim 1, wherein the one or more substantially magnetic film layers comprises at least one non-granular magnetic film layer.

6. The medium of claim 1, wherein the one or more polarization conductor layers comprise at least one of Pt and Pd.

7. The medium of claim 1, wherein the one or more substantially magnetic layer comprises at least one of Co and Fe.

8. The medium of claim 1, wherein each layer of the one or more substantially magnetic layers and each layer of the one or more polarization conduction layers has a thickness between approximately 0.5 Å to approximately 12 Å.

9. The medium of claim 1, wherein the multi-layer stack has a thickness between approximately 1 Å and approximately 240 Å.

10. The medium of claim 1, wherein the perpendicular recording layer includes a hard magnetic layer comprising the granular layer and the multi-layer stack, and a soft magnetic layer, wherein the hard magnetic layer and the soft magnetic layer are non-coherently exchanged coupled to one another in a direction substantially vertical to a plane of the perpendicular recording layer.

11. The medium of claim 10, wherein the perpendicular recording layer includes a break layer between the hard magnetic layer and soft magnetic layer.

12. The medium of claim 10, wherein the perpendicular recording layer is disposed between the soft magnetic layer and the substrate and an exchange break layer is disposed between the perpendicular recording layer and the soft magnetic layer.

13. The medium of claim 10, wherein the soft magnetic layer is a granular layer.

14. The medium of claim 1, wherein the perpendicular recording layer includes a continuous granular coupled layer formed on the multi-layer stack.

15. The medium of claim 1, wherein the granular layer comprises a Co alloy and non-magnetic oxide, wherein the perpendicular recording layer has an effective magnetic anisotropy greater than approximately 25 kOe.

16. The medium of claim 1, wherein the perpendicular recording layer is disposed between a continuous granular composite (CGC) layer and the substrate.

17. A method of manufacturing a medium, the method comprising:
    forming a perpendicular recording layer on a substrate, wherein the perpendicular recording layer comprises a granular layer having a first magnetic anisotropy and a multi-layer stack adjacent the granular layer, the multi-layer stack comprising one or more substantially magnetic film layers alternating with one or more polarization conductor layers,
    wherein the multi-layer stack has a second anisotropy that is greater than the first anisotropy and wherein at least one of thicknesses of the magnetic film layers form a thickness gradient of the magnetic film layers in all or a portion of the multi-layer stack and thicknesses of the polarization conduction layers form a thickness gradient of the polarization conduction layers in all or a portion of the multi-layer stack.

18. The method of claim 17, wherein the multi-layer stack is adjacent to the granular layer and the perpendicular recording layer has an effective magnetic anisotropy greater than that of the first magnetic anisotropy.

19. The method of claim 17, wherein the perpendicular recording layer has an effective anisotropy greater than 25 kOe.

20. The method of claim 17, wherein the one or more polarization conductor layers comprise at least one of Pt and Pd, and the one or more substantially magnetic layer comprises at least one of Co and Fe.

21. The method of claim 17, wherein each layer of the one or more substantially magnetic layers and each layer of the one or more polarization conduction layers has a thickness between approximately 0.5 Å to approximately 12 Å.

22. The method of claim 17, wherein the granular layer comprises a Co alloy and non-magnetic oxide, wherein the perpendicular recording layer has an effective magnetic anisotropy greater than approximately 25 kOe.

23. An article comprising a first magnetic recording layer, the first magnetic recording layer including a granular layer having a first magnetic anisotropy and a multi-layer stack adjacent the granular layer, the multi-layer stack comprising one or more substantially magnetic film layers alternating with one or more polarization conductor layers,
    wherein the multi-layer stack has a second magnetic anisotropy that is greater than the first magnetic anisotropy and wherein at least one of thicknesses of the magnetic film layers form a thickness gradient of the magnetic film layers in all or a portion of the multi-layer stack and thicknesses of the polarization conduction layers form a thickness gradient of the polarization conduction layers in all or a portion of the multi-layer stack.

24. The article of claim 23, wherein one or both of the magnetic film layers and the polarization conduction layers are non-granular.

25. The article of claim 23, wherein a composition of one or both of the magnetic film layers and the polarization conduction layers varies from layer to layer.

* * * * *